US007843836B2

(12) United States Patent
Elliott et al.

(10) Patent No.: US 7,843,836 B2
(45) Date of Patent: Nov. 30, 2010

(54) SYSTEMS, METHODS AND COMPUTER PROGRAM PRODUCTS FOR CONTROLLING HIGH SPEED NETWORK TRAFFIC IN SERVER BLADE ENVIRONMENTS

(75) Inventors: John C. Elliott, Tucson, AZ (US); Gregg S. Lucas, Tucson, AZ (US); Robert D. Medlin, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 12/119,152

(22) Filed: May 12, 2008

(65) Prior Publication Data

US 2009/0279439 A1 Nov. 12, 2009

(51) Int. Cl.
*G01R 31/08* (2006.01)
(52) U.S. Cl. .................................... 370/241
(58) Field of Classification Search ............... None
See application file for complete search history.

(56) References Cited

U.S. PATENT DOCUMENTS

| 4,524,440 | A | 6/1985 | Orsic | |
|---|---|---|---|---|
| 6,507,923 | B1 * | 1/2003 | Wall et al. ................... | 714/712 |
| 6,779,145 | B1 | 8/2004 | Edwards et al. | |
| 6,966,003 | B1 * | 11/2005 | Joseph et al. ................. | 726/14 |
| 7,277,702 | B2 * | 10/2007 | Ropolyi et al. .............. | 455/433 |
| 7,313,096 | B2 * | 12/2007 | Kocalar et al. .............. | 370/241 |
| 2005/0267967 | A1 | 12/2005 | Markos et al. | |
| 2006/0224375 | A1 | 10/2006 | Barnett et al. | |
| 2008/0043630 | A1 * | 2/2008 | Chen et al. .................. | 370/244 |
| 2008/0205330 | A1 * | 8/2008 | Stadler et al. ............... | 370/328 |
| 2008/0247416 | A1 * | 10/2008 | Gentieu et al. .............. | 370/465 |
| 2008/0267060 | A1 * | 10/2008 | Blinick et al. ............... | 370/216 |
| 2008/0267192 | A1 * | 10/2008 | Blinick et al. ............. | 370/395.7 |

* cited by examiner

*Primary Examiner*—Chi H Pham
*Assistant Examiner*—Fan Ng
(74) *Attorney, Agent, or Firm*—Cantor Colburn LLP; Randall Bluestone

(57) ABSTRACT

Systems, methods and computer program products for controlling high-speed network traffic in server blade environments. Exemplary embodiments include a method for controlling high-speed network traffic in a server blade network, the method including identifying a port under test, identifying a debug port, identifying a code state of interest from the port under test and generating a modified IDLE word in response to an identification of a code state of interest from the port under test.

20 Claims, 10 Drawing Sheets

US 7,843,836 B2

SYSTEMS, METHODS AND COMPUTER PROGRAM PRODUCTS FOR CONTROLLING HIGH SPEED NETWORK TRAFFIC IN SERVER BLADE ENVIRONMENTS

TRADEMARKS

IBM® and BladeCenter® are registered trademarks of International Business Machines Corporation, Armonk, N.Y., U.S.A. Other names used herein may be registered trademarks, trademarks or product names of International Business Machines Corporation or other companies.

BACKGROUND OF THE INVENTION

Field of the Invention

This invention relates to storage network systems, and particularly to systems, methods and computer program products for controlling high-speed network traffic in server blade environments.

DESCRIPTION OF BACKGROUND

Background

In storage network systems such as illustrated in FIG. 1, which have internalized high-speed fabrics, a high-speed switch is used to provide connectivity amongst individual servers and associated storage. In addition, such network storage systems can include multiple high-speed fabrics (1× and 4×). High-speed differential signaling is used to provide high bandwidth connections between a central serial attached SCSI (SAS) switch and other endpoints such as other switches or downstream or upstream storage components. SAS can implement several configurations, such as fiber channel, Ethernet, SCSI, etc., and several topologies, such as 16 external SAS ports, which can be "wide" or "narrow". A wide port can include single 1× links (e.g., PHYs) or multiple links for a 4×, 8×, 12×, etc., wide port.

In such systems, much of the storage area network (SAN) is internalized, wherein the server blades and the switch modules are coupled to one another via internal fabric. Such internalization can create problems that require access to pertinent data for problem detection, analysis and fault isolation. In some SAN systems, test equipment (e.g., a logic analyzer) can be inserted or onto a suspected high-speed interface such as the external fiber channel and capture pertinent data for problem resolution. However, when high-speed fabrics are internalized, it becomes difficult to access the fabric for troubleshooting problems. Although solutions, such as creating software trace events in microcode and directing error messages to a debug port, have been implemented, such solutions have shortcomings, including inaccurate detail of the failure, non real-time reporting of the failure, and resultant numerous iterations of adding a debug patch to isolate the problem. Other more invasive methods can include adding wires to a card to allow internal probing. This hardware-type approach is invasive to the system, limiting in analysis capability, and can cause potential corruption of the monitored data. In other instances, permanent electrical damage to the probed fabric circuitry can result. Although many of these approaches can be implemented in a controlled laboratory setting, these approaches are unsuitable for a customer environment. Therefore, there exists a need for systems and methods to troubleshoot internalized high-speed fabric networks in a customer environment.

Even with the ability to monitor the network, currently there a secondary console is needed to communicate and control with the trace component is needed. This method of control makes it difficult to coordinate snoop capture functions with the actual operation that the user is trying to capture. Alternatively, the debug port would need to be addressed as an actual SAS addressable port. Communication would therefore alter the SAS network dynamics and affect the trace results.

BRIEF SUMMARY

Exemplary embodiments include a method for controlling high-speed network traffic, the method including identifying a port under test, identifying a debug port, identifying a code state of interest from the port under test and generating a modified IDLE word in response to an identification of a code state of interest from the port under test.

Further embodiments include a computer program product for controlling high-speed network traffic, the computer program product including a tangible storage medium readable by a processing circuit and storing instructions for execution by the processing circuit for performing a method including identifying a port under test, identifying a debug port, identifying a code state of interest from the port under test and generating a modified IDLE word in response to an identification of a code state of interest from the port under test.

Additional embodiments include a switch module system for controlling high-speed network traffic, the system including a port under test and a debug port communicatively coupled to the port under test, wherein the port under test is configured to transmit and receive configurable IDLE words.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

TECHNICAL EFFECTS

As a result of the summarized invention, real-time control of internal high speed fabric problems can be effectively monitored and traced wherein a traced device can communicate modified IDLE words to a tracing device in response to a code state of interest. In this way, the tracing device can capture only the data of interest. Furthermore, since the IDLE words are meaningless to other devices in the system but are nonetheless legal IDLE words, an in-band communication is established between the traced device and the tracing device.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

In exemplary embodiments, by implementing port mirroring of the systems (e.g., SAN systems) described herein, the systems' internal fabric can be effectively monitored and traced via IDLE word modification/modulation. Exemplary embodiments include systems and methods for monitoring high-speed network traffic via port mirroring such that data streams can be mapped and multiplexed via SAS switches. As such, snooping methods can be implemented on a high-speed SAS wide port such that when a traffic failure is detected, IDLE words can be implemented to initiate, control and cease data collection at a particular code state of interest. The SAS protocol allows for several different IDLE word values as part of the protocol. In exemplary embodiments, by implementing a sequence of different IDLE words (e.g., words transmitted on a communications line that are not intended to represent data and does not result in an output operation at the accepting terminal) the system under trace can communicate with trace functions, setting up or enabling triggers, and modifying trace modes. For example, if a server communicating over a SAS switch is experiencing an otherwise normal traffic flow, but for some traffic anomaly, the server can implement IDLE words to communicate to a trace device (e.g., another server, a debugging computer, a logic analyzer, etc.) to begin collecting data at a particular code state (i.e., code state of interest) where the anomaly is occurring. Furthermore, the IDLE words can be modified in order to trigger the trace device to collect a certain amount of data and to cease collection of data. This communication is performed without altering the functional system configuration. According to further exemplary embodiments, the systems and methods described herein dynamically control the value of the IDLE word of the SAS protocol chipset. Currently, chipsets include one or more IDLE words set during chip configuration. In exemplary embodiments, modifications of the logic in SAS protocol chipsets are implemented to switch IDLE words dynamically.

In exemplary embodiments, the high-speed network traffic systems described herein can be configured in numerous manners to perform tracing and debug functions. The resulting switch configurations can, in turn, implement snooping in which the exemplary IDLE word modifications are implemented. The following figures illustrate examples of switch configurations in which the exemplary systems and methods described herein can be implemented. It is appreciated that the following figures are illustrative. Numerous other configurations are contemplated in other exemplary embodiments.

Figure 1:
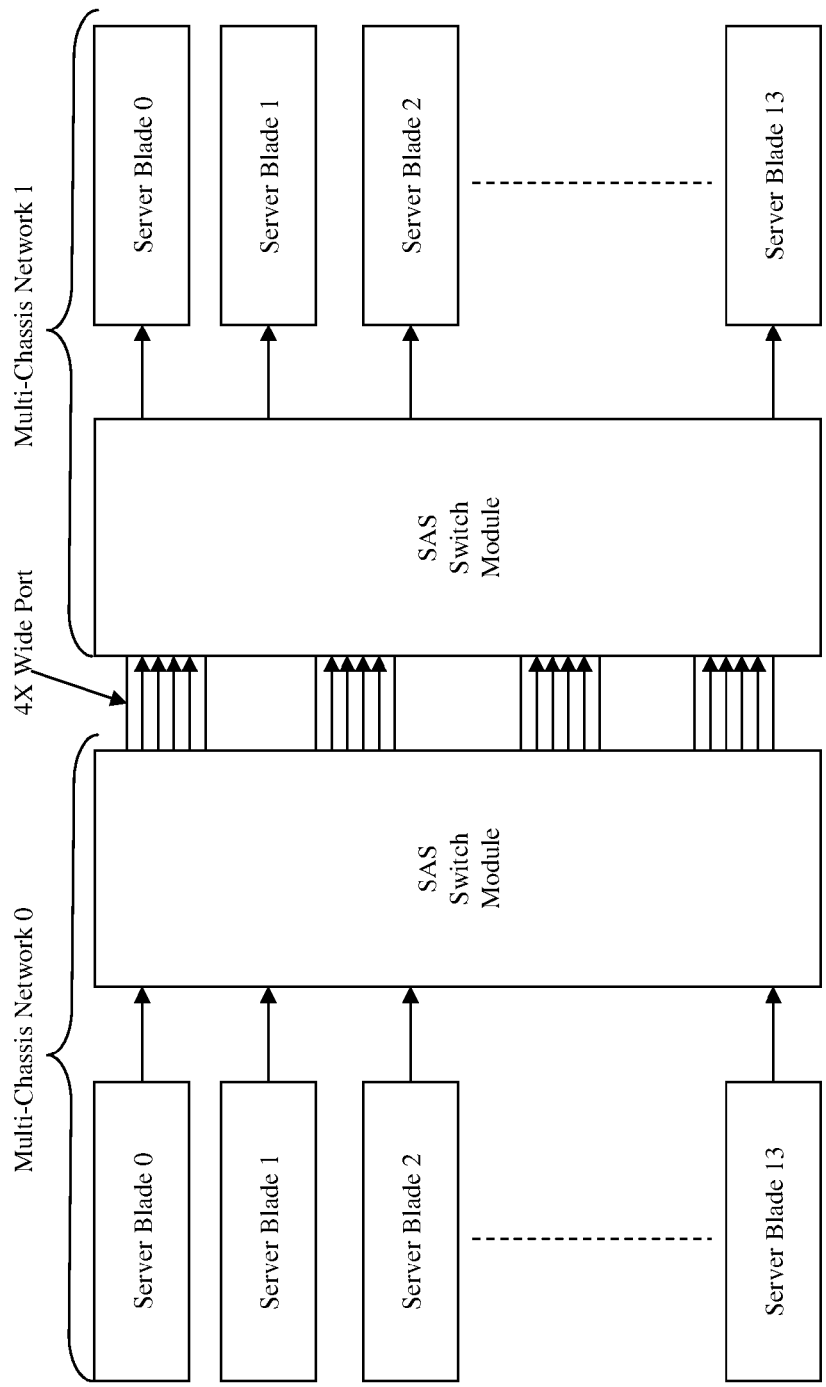
FIG. 1 illustrates an example of a prior art SAS storage network having two multi-chassis networks, each having fourteen blade servers.
Figure 2:
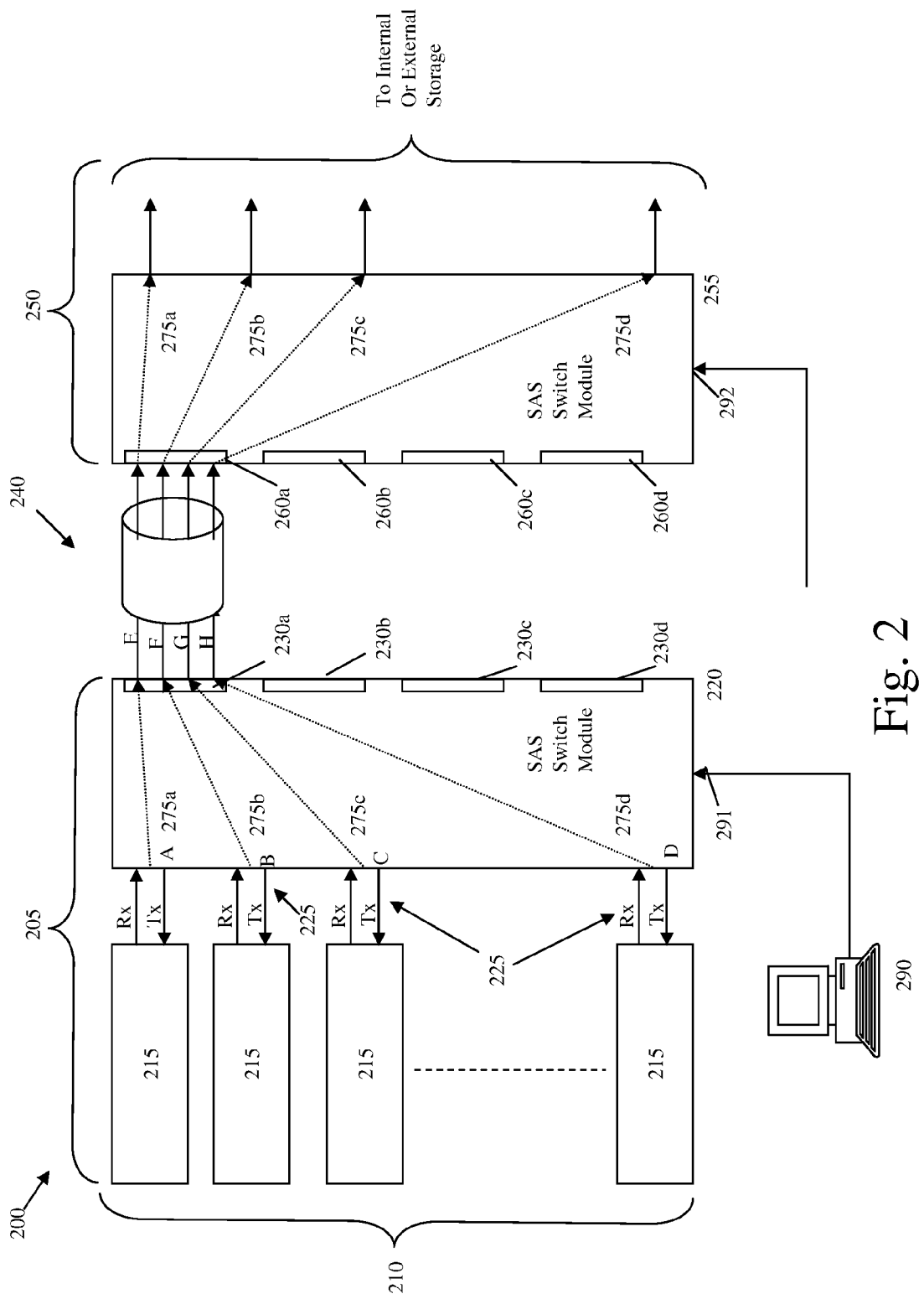
FIG. 2 illustrates one example of a SAS storage network system configured in accordance with exemplary embodiments.

FIG. 2 illustrates one example of a SAS storage network system 200 configured in accordance with exemplary embodiments. The system 200 can include a first chassis network 205 having a first chassis 210 with multiple independent servers 215 (i.e., server blades), each independent server 215 having, among other things, a blade controller and an I/O controller. The first chassis 210 is coupled to and in communication with a first switch module 220. The first chassis 210 is coupled to the first switch module 220 through internal fabric 225, which can be single links A, B, C, D (e.g., 1×) between each independent server 215 and an input of the first switch module 220. The first switch module 220, which can be a SAS switch module, can, among other things, route and switch network data traffic to external fabric 240 via various wide ports 230a, 230b, 230c, 230d and/or individual data links, such as links E, F, G, H. In the example shown in FIG. 2, a single wide port 230a is illustrated having four individual links E, F, G, H, thereby forming a 4× wide port, that is, wide port 230a. It is understood and appreciated that in other embodiments, the external fabric 240 can support any combination of data links and wide ports, such as but not limited to multiple single 1× links or other wide port configurations, including but not limited to 8×, 12×, 16×, etc. It is further appreciated that first switch module 220 is routing data streams 275a, 275b, 275c, 275d from independent servers 215 to external fabric 240.

The system 200 further includes a second chassis network 250, having a second switch module 255, having wide ports 260a, 260b, 260c, 260d and the data links E, F, G, H, and coupled to the first switch module 220 via the external fabric 240. It is appreciated that the external fabric 240, which can be a fiber cable, Ethernet Cable, SCSI cable, etc., is the medium that couples the wide ports 230, 260, via individual links E, F, G, H, to one another. The second switch module 255 can be coupled to and in communication with other internal or external storage such as, but not limited to, a second network chassis, a switch bunch of disks (SBOD), etc. It is further appreciated that any number of additional chassis networks, or other storage network media can be coupled to and in communication with the first and second chassis networks 205, 250, either upstream or downstream.

In general, high-speed switch technology provides the ability to selectively and redundantly mirror high-speed traffic to ports (e.g., wide ports, individual data links, etc.) on the same switch. For example, one or more of the wide ports 230a, 230b, 230c, 230d (or individual data links E, F, G, H) on first switch module 220 can be configured to monitor the other wide ports 230a, 230b, 230c, 230d (or individual data links E, F, G, H) on the first switch module 220. Such use of the wide ports 230a, 230b, 230c, 230d and/or data links E, F, G, H is now described in accordance with exemplary embodiments. This monitoring feature is also known as "snooping", that is, high-speed traffic in progress through, for example, the first switch module 220 can be "snooped" or monitored and then directed to yet another port on the first switch module 220, that is, the port being dedicated for snooping. It is appreciated that, in order to have a snooping port or link, the first switch module 220 has available ports or links for snooping. In the system 200 illustrated in FIG. 2, all external switch ports can be used for SAS I/O traffic. In an exemplary embodiment, the wide port 230a can include several data links and can support data streams. FIG. 2, as an example, illustrates that each of the four server blades 215 is accessing the external storage, in this case via second switch module 255, and through respective links E, F, G, H within the wide port 230a. Further, it is appreciated that the first switch module 220 may dynamically route (distribute) the server traffic (data streams 275a-275d) across all links, such as links E, F, G, H, within a wide port, such as wide port 230a, in various ways. As such, it is non-deterministic as to which I/O stream is routed through which link. Therefore, FIG. 2 illustrates a pre-cursor configuration to exemplary systems and methods for monitoring high-speed network traffic via sequentially multiplexed data streams.

The following figures illustrate several examples of port mirroring implemented in accordance with exemplary embodiments.

Figure 3:
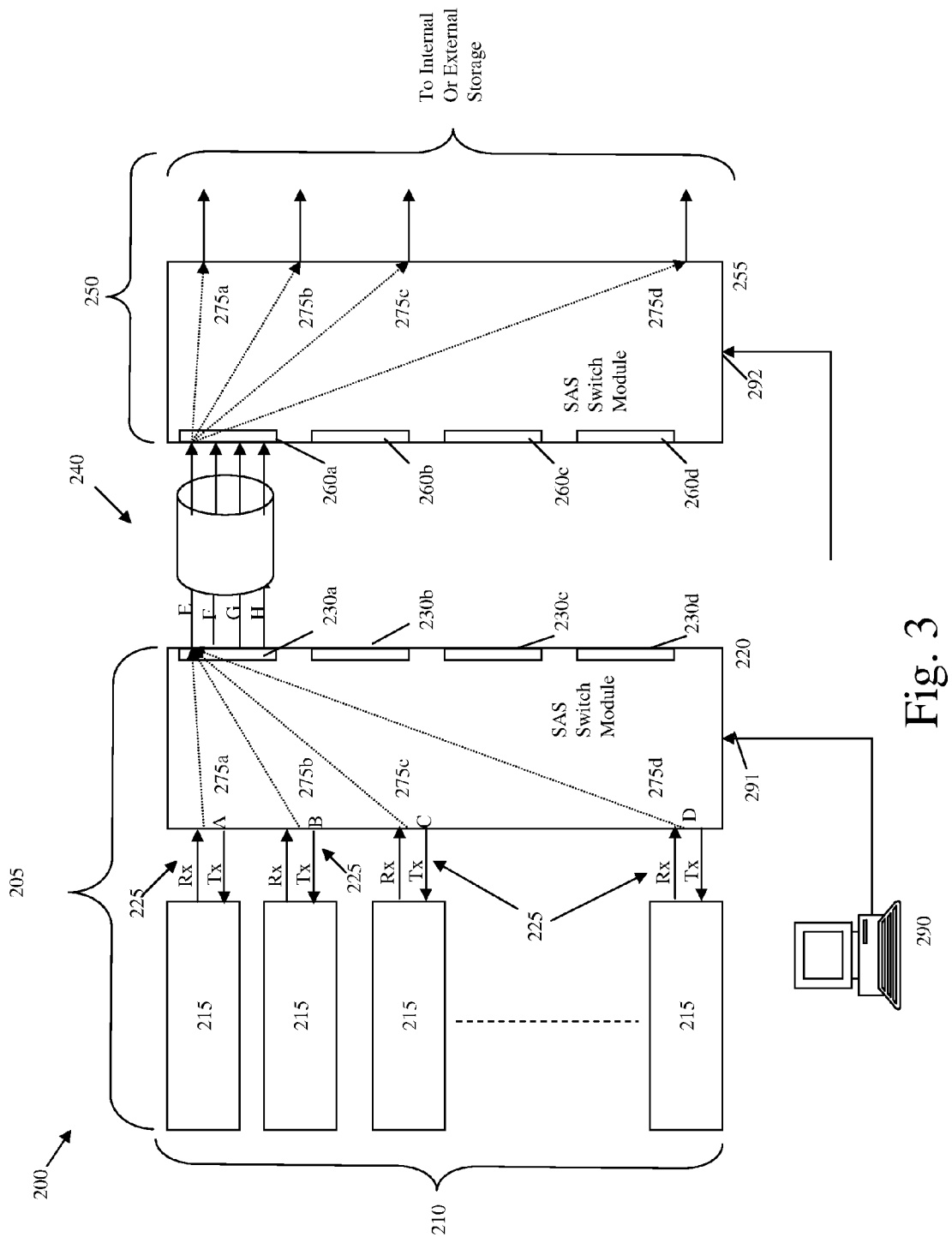
FIG. 3 illustrates the example of the SAS storage network system of FIG. 2 configured in accordance with exemplary embodiments.

FIG. 3 illustrates the example of the SAS storage network system 200 of FIG. 2 configured in accordance with exemplary embodiments. When troubleshooting system I/O problems it is necessary to capture a trace of the I/O activity in real time. As such a logic analyzer (not shown) can be coupled to the system 200 for monitoring the I/O. In an exemplary embodiment, all I/O traffic, that is, all data streams 275a-275d is routed to a single link E within the wide port 230a. It is appreciated that in other exemplary embodiments and implementations, the I/O traffic can be routed to other links and wide ports. By routing all I/O traffic to a single link, the remaining links F, G, H in the wide 230a are free of data traffic. Furthermore, by re-routing the data streams 275a-275d onto the single link E, it is ensured that the I/O that is failing is routed on a single link E that is capable of being monitored. It is appreciated that several data rates such as 3 Gb/s and 6 Gb/s are contemplated as being supported on data links E, F, G, H in exemplary embodiments. As such, if for example, all data streams 275a-275d flow at a rate of 3 Gb/s, then the link E can be configured at 3 Gb/s, thereby allowing traffic to flow on the link sequentially. For example, data stream 275a is transferred on data link E, then data stream 275b is transferred on data link E, then data stream 275c is transferred on data link E, and then data stream 275d is transferred on data link E. All configurations as just discussed can be made via external computing device 290 coupled to debugging port 291. Therefore, at some point link A, traffic is transferring incorrect data causing an I/O failure. The problem could be incoming data from an independent server 215 in chassis 210 or data that is exiting the first switch module 220 on link E. Therefore, in order to isolate the fault, the stream 275a prior to entering first switch module 220 and after entering first switch module 220 are of interest to be captured by the logic analyzer 270, and routed as discussed.

Figure 4:
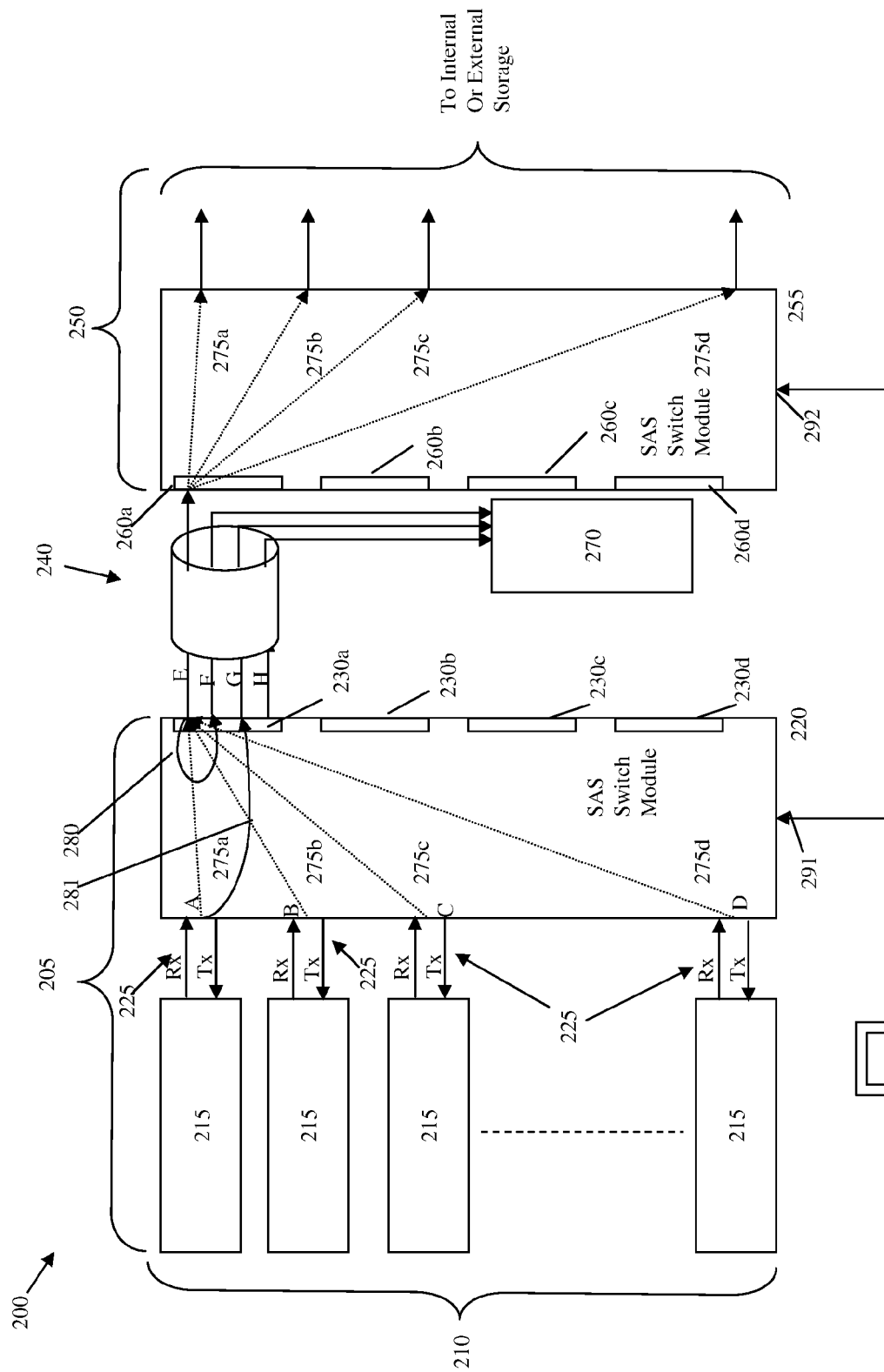
FIG. 4 illustrates the example of the SAS storage network system of FIG. 2 configured in accordance with exemplary embodiments.

FIG. 4 illustrates the example of the SAS storage network system 200 of FIGS. 2 and 3 configured in accordance with exemplary embodiments. Two links F, G of three unused links F, G, H can be further configured as snoop links. In this example, the failing I/O has been determined to be from the independent server 215 with data stream 275a. In an exemplary implementation, to debug the problem, the data stream 275a going into the first switch module 220 via port A, and the data stream 275a leaving the first switch module 220 via data link E is monitored. As shown in FIG. 4, these two paths are routed to links F, G, as snooped data streams 280, 281, respectively. As such, in the configuration shown in FIG. 4, the data stream 281 represents the data stream prior to entering the first switch module 220, and the data stream 280 represents the data stream after it has flowed from the first switch module 220. In such a configuration, the external fabric used is a breakout cable that allows link E to flow between wide port 230a and wide port 260a. The remaining links F, G, H, however, are routed to the logic analyzer 270 for analysis.

Figure 5:
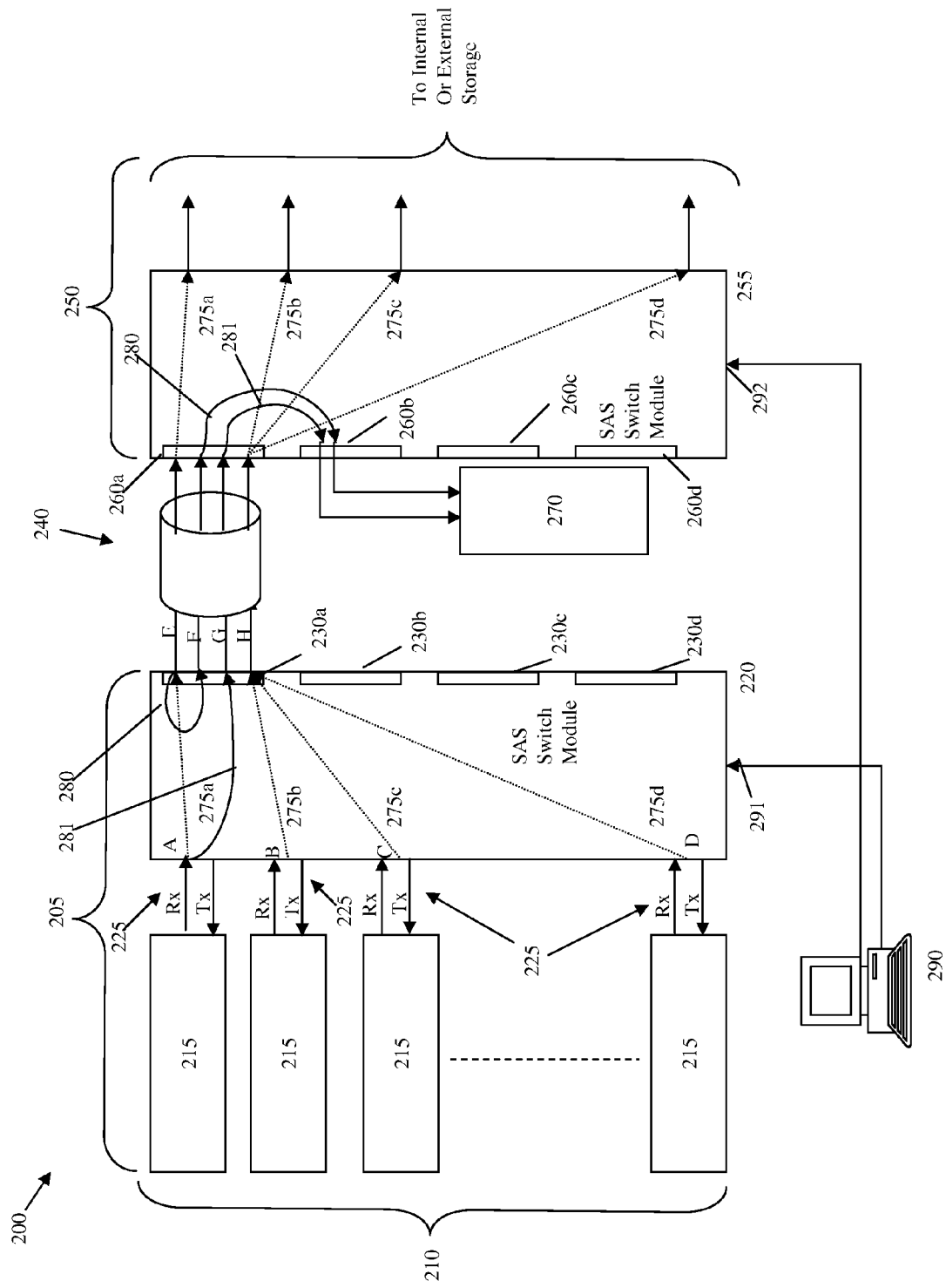
FIG. 5 illustrates the example of the SAS storage network system of FIG. 2 configured in accordance with exemplary embodiments.

FIG. 5 illustrates the example of the SAS storage network system 200 of FIGS. 2 and 3 configured in accordance with exemplary embodiments. As discussed, external computing device 290 can be used to configure the system 200 to dynamically route the data streams 275b, 275c, 275d from the independent servers 215 in the first switch module 220. In the general case, each independent server 215 is routed to a specific link, but if a link fails, its data can be re-routed to one of the remaining operational links. Thus, at any time it may not be known which data is going out on which link. Therefore, as discussed with respect to FIG. 4, all traffic should be funneled to a single link E and that link is required to be an operational link. In the current example, the data stream 275a on link A, flows through the first switch module 220 and out on link E has an error as detected by the first switch module 220 or on the second switch module 255. However, the link E is still operational and can reliably transfer data out link E. Thus, the other data streams 275b, 275c, 275d that are all redirected thru link E are still operational and unaffected by the corrupted data stream 275a on the link path A to E. In an exemplary embodiment, once a failing path is determined, that is, link a data stream 275a, the first switch module 220 may be specifically configured via external computing device 290, to statically route the data traffic through a specific link to the second switch module 255. By rerouting the unaffected data traffic, the failed operation is constrained to a fixed path for troubleshooting. The other known good data transfers 275b, 275c, 275d from the other independent servers 215 can all be funneled to a known good link, e.g. Link H. For this example then, the corrupted data stream 275a on link A is routed through link E to the second switch module 255. The two snooped data streams 280, 281 are routed to links F, G, as discussed. The remaining data traffic 275b, 275c, 275d is all routed to link H. As discussed above, it is appreciated that the data streams 275b, 275c, 275d are transferred sequentially on data link H.

FIG. 5 further illustrates the example of the SAS storage network system 200 of FIGS. 2 and 3 configured in accordance with alternate exemplary embodiments. As discussed above, if data stream 275a, for example, has already been identified as the data stream with a data failure, then all the other data streams 275b, 275c, 275d can be rerouted to link H. Similarly, this configuration can be done in real time during normal operation of the system 200 without any disruptions.

It is appreciated that the configurations discussed with respect to FIGS. 4 and 5 include an intervention to the system 200 by replacing an external breakout cable for the external fabric 240. As discussed, configurations can be done in real time to route data traffic as needed. In still another exemplary embodiment, a configuration can be done in real time during normal operation of the system 200 without any disruptions. Regardless of the manner in which the systems described above are configured for snooping, the systems and methods as described herein implement IDLE words to initiate communication when a code state of interest is experienced in the device being snooped/traced. In exemplary embodiments, when the snooped/traced device experiences a code state of interest, the snooped/traced device can implement modified IDLE words to trigger the tracing device (e.g., debugging computer 290, the logic analyzer 270, etc.) to begin capturing data generated from the code state of interest.

The mirroring systems and methods described above include both internal and external mirroring. As discussed, when troubleshooting system I/O problems amongst the internal server and internal storage it becomes necessary to capture a trace of the I/O activity in real time. There may be reasons it is impractical to direct internal trace data to external switch ports, for example, all the external switch ports may be dedicated to external storage applications. Thus, it is necessary to provide an internalized trace or snooping function. Such snoop data can be directed to an internal "snoop blade" that is designed specifically for capturing and externalizing trace data. Furthermore, today's current art for providing snoop ports within a switch module is to route snoop data from a selectable switch input/output port to a selectable output port. It is appreciated that the links A, B, C, D described herein include both receiver (Rx) ports and transmit (Tx) ports. In exemplary embodiments, the mirroring systems and methods described herein are implemented to mirror/map Rx and Tx ports in accordance with exemplary embodiments. More specifically, one snoop path can be routed to a single transmit port (Tx) of a differential transmitter/receiver port pair. Thus, for each path port to be snooped an output port must be consumed, where just the transmit (Tx) portion of the port is implemented the receiver portion (Rx) of the port is unused.

Figure 6:
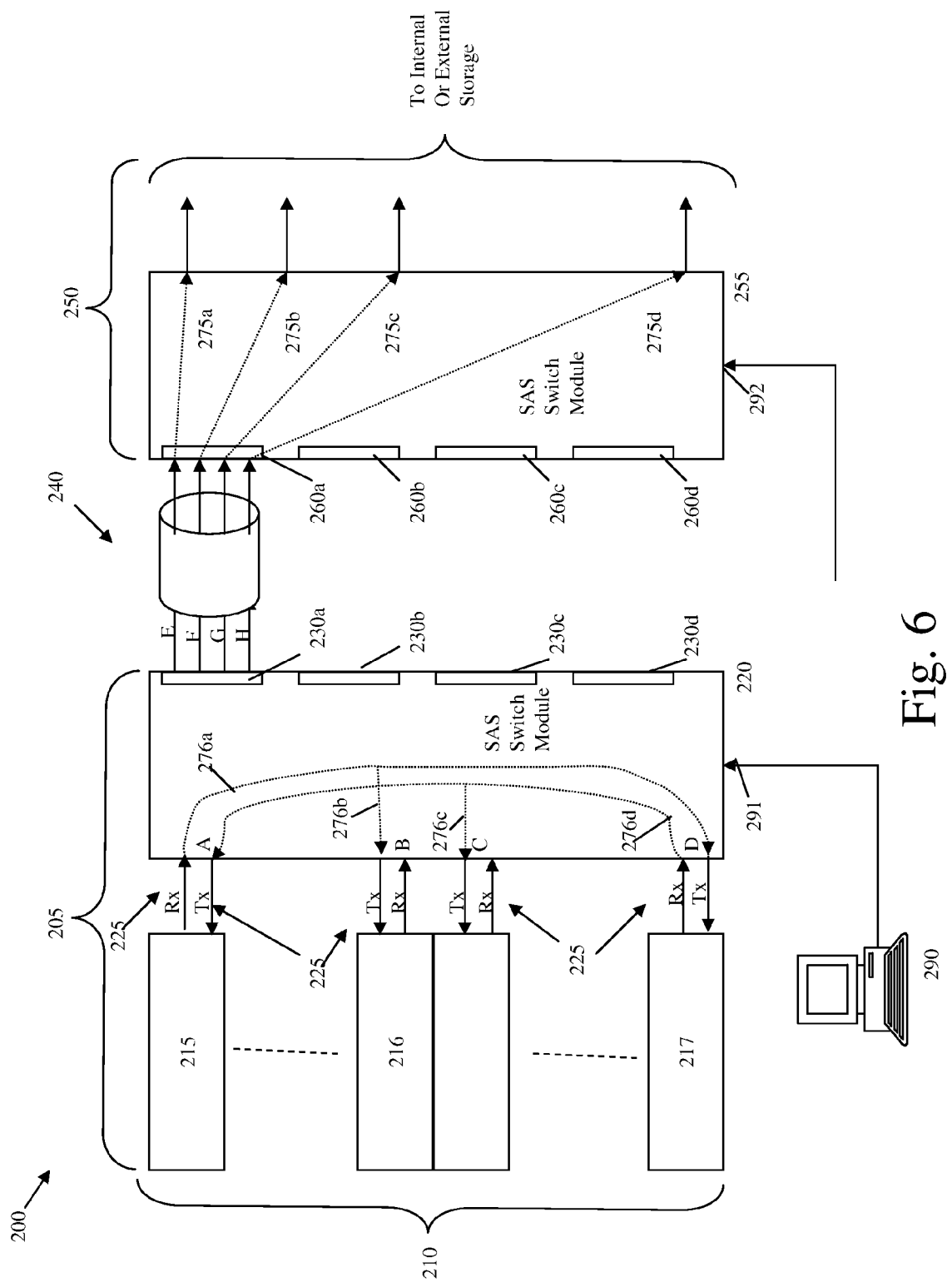
FIG. 6 illustrates the example of the SAS storage network system of FIG. 2 configured in accordance with alternate exemplary embodiments.

FIG. 6 illustrates the example of the SAS storage network system of FIG. 2 configured in accordance with alternate exemplary embodiments. The system 200 is configured with two blade servers 215, 217 and a double wide snoop blade server 216. Each of the blade servers 215, 217 includes links A and D respectively, the links A, D including a transmit (Tx) a receiver (Rx) port pair. The double wide server blade 216 includes two links B, C, each having a Rx/Tx port pair. As discussed above, the mirroring systems and methods described herein are implemented to mirror/map Rx and Tx ports in accordance with exemplary embodiments. More specifically, one snoop path can be routed to a single transmit port (Tx) of a differential transmitter/receiver port pair on links B, C. Thus, for each path port to be snooped (e.g., links A, D on servers 215, 217 respectively) an output port is consumed (E.g., links B, C on double wide server 216), where just the transmit (Tx) portion of the port is implemented the receiver portion (Rx) of the port is unused. As illustrated, a data stream 276a from the independent server 215 in the first switch module is routed from the Rx port of the server 215 to the Tx port of the server 217. Similarly, the Rx port of the server 217 is routed to the Tx port of the server 215. In the general case, each independent server 215 is routed to a specific link, but if a link fails, its data can be re-routed to one of the remaining operational links. Thus, at any time it may not be known which data is going out on which link, and more specifically, which data is on which Rx and Tx ports. In the configuration as illustrated, a failing I/O data stream which can be mapped between respective Rx and Tx ports of the servers 215, 217, can be snooped to either of the Tx ports of the double wide snoop blade server 216. As discussed, external computing device 290 can be used to configure the system 200 to dynamically route the data streams. FIG. 6 illustrates a single port being snooped in accordance with exemplary embodiments.

Figure 7:
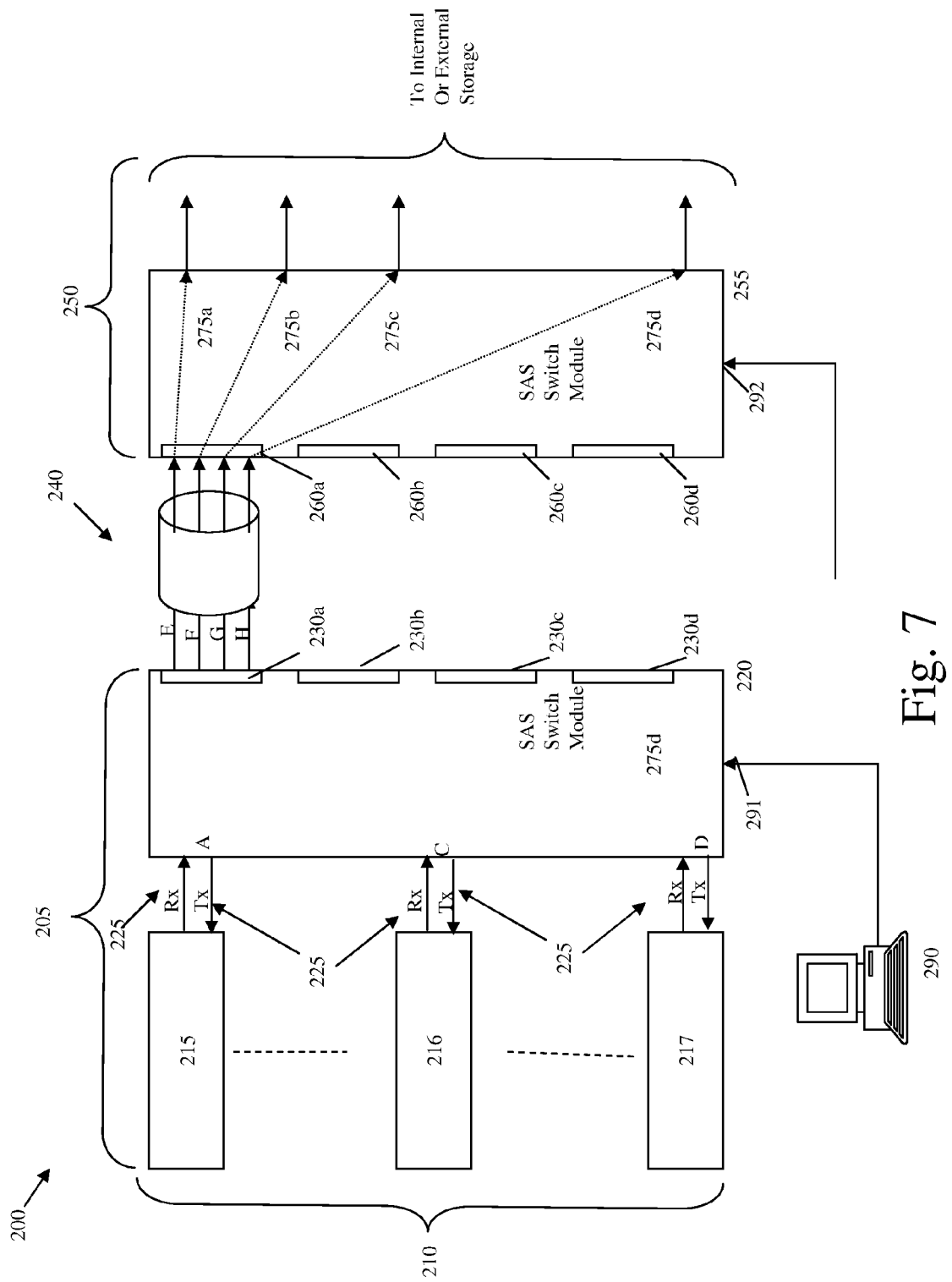
FIG. 7 illustrates the example of the SAS storage network system of FIG. 2 configured in accordance with alternate exemplary embodiments.
Figure 8:
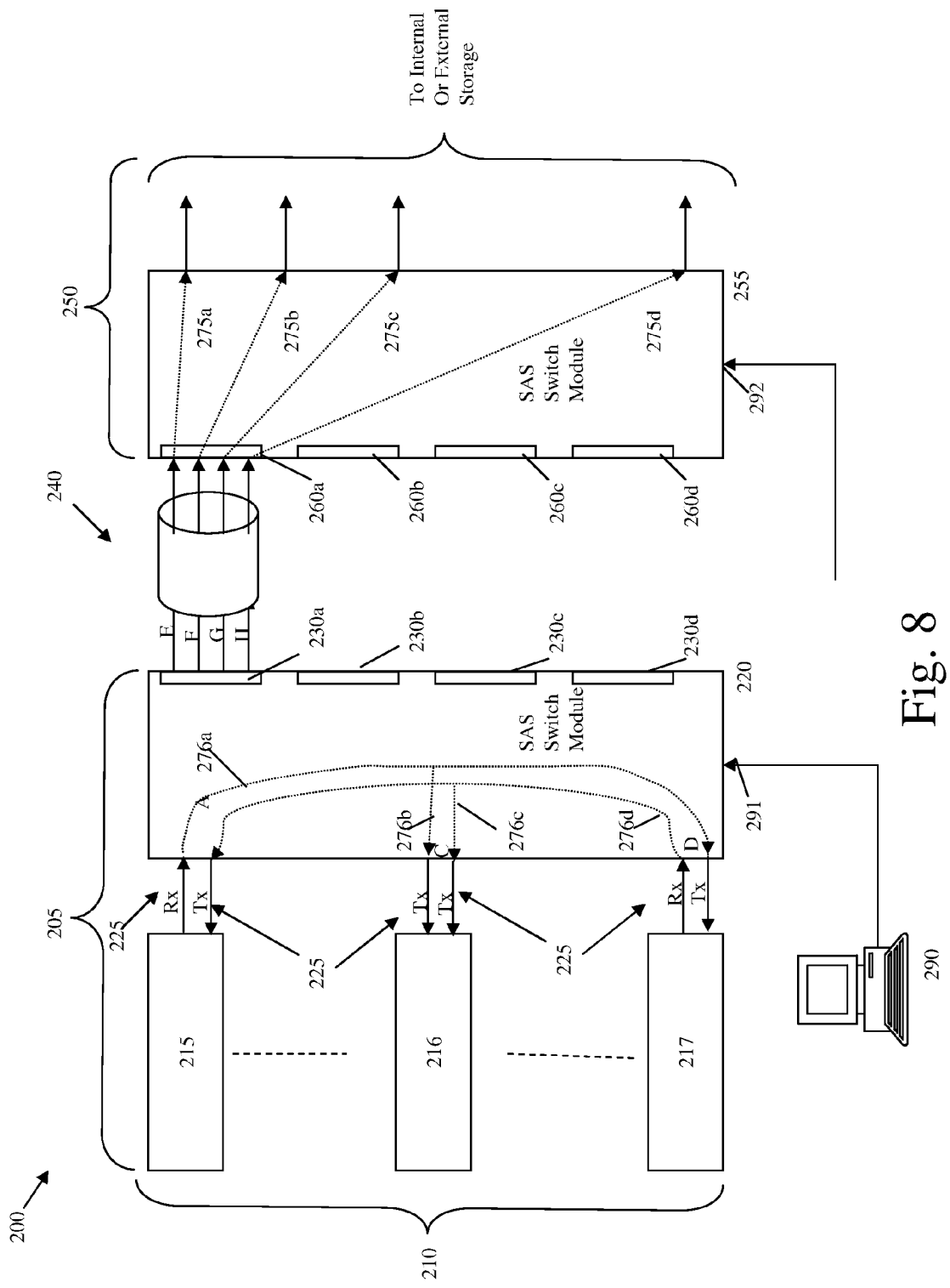
FIG. 8 illustrates the example of the SAS storage network system of FIGS. 2 and 7 configured in accordance with alternate exemplary embodiments.

It is appreciated that oftentimes, two ports must be snooped to compare data into and out of a switch or blade. Given this scenario, a single snoop blade may not provide adequate high speed tracing of a failing I/O traffic data stream. FIG. 7 illustrates the example of the SAS storage network system of FIG. 2 configured in accordance with alternate exemplary embodiments. In exemplary embodiments, the SAS switch modules 220, 255 implement their respective high speed differential ports to include a transmit signal and what is normally the receive signal, to be implemented as both a receive and transmit function. As illustrated, the system include the servers 215, 216, 217, each having links A, B, D respectively. In exemplary embodiments, the server 216 can be the snoop blade. In the configuration described and as illustrated, in normal operation the receiver function is selected on the server 216 such that the link C includes a Rx/Tx pair. In exemplary embodiments, when the server 216 is configured for snooping the transmit function is selected. FIG. 8 illustrates the example of the SAS storage network system of FIG. 2 and FIG. 7 configured in accordance with alternate exemplary embodiments. As such, the link C of the server 216 is configured to include a Tx/Tx pair. As discussed, external computing device 290 can be used to configure the system 200 to dynamically route the data streams. As such, the external computing device can be configured to dynamically switch to and from the Rx/Tx and Tx/Tx configurations of the server 216. Such an implementation provides for double the snooping density in any given port. With double the snooping density, the systems and methods described herein can route dual snoop paths (i.e. input and output traffic) to a single blade slot. It is appreciated that a single blade slot in the system 200 can be readily encountered. As illustrated, a data stream 276a from the independent server 215 in the first switch module is routed from the Rx port of the server 215 to the Tx port of the server 217. Similarly, the Rx port of the server 217 is routed to the Tx port of the server 215. In the general case, each independent server 215 is routed to a specific link, but if a link fails, its data can be re-routed to one of the remaining operational links. Thus, at any time it may not be known which data is going out on which link, and more specifically, which data is on which Rx and Tx ports. In the configuration as illustrated, a failing I/O data stream which can be mapped between respective Rx and Tx ports of the servers 215, 217, can be snooped to either of the now configured Tx ports of the snoop blade server 216. As discussed, external computing device 290 can be used to configure the system 200 to dynamically route the data streams.

As discussed above, regardless of the manner in which the systems described above are configured for snooping, the systems and methods as described herein implement IDLE words to initiate communication when a code state of interest is experienced in the device being snooped/traced. Several other snooping/tracing/debugging configurations are contemplated in other exemplary embodiments. In exemplary embodiments, when the snooped/traced device experiences a code state of interest, the snooped/traced device can implement modified IDLE words to trigger the tracing device (e.g., debugging computer 290, snoop blade 216, etc.) to begin capturing data generated from the code state of interest.

In exemplary embodiments, the configurations of FIGS. 2-8 can be implemented to dynamically control the values of IDLE words of the SAS protocol chipset as now discussed. In exemplary embodiments, the debug ports as described herein (e.g., via the external computer 290, logic analyzers 270 or snoop servers 216) passively receive the I/O data streams as illustrated in FIGS. 2-8. It is appreciated that implementing current snooping techniques in a switched network such as the system 200, it can be difficult to differentiate transfers and identify the point of interest (e.g., points of failures in the I/O data streams) without interruption of the transactions. In exemplary embodiments, the port under test, as with any active SAS port, constantly transmits and receives IDLE words on the interface when there is no active transaction. As described above, IDLE words are transmitted and received in the internal fabric and do not represent data and do not result in an output operation at the accepting ports. In exemplary embodiments, the port under test, and which may include a data failure is ultimately run by code in a processor (e.g., one of the server blades described herein). The code includes states that can be identified as points of interest, particularly in the case of a data failure. Thus, the code states of the system under test define the trace information that is to be monitored.

In exemplary embodiments, the systems and methods described herein modify the IDLE words such that when the systems described herein are configured in accordance with the mirror/map paths as described above, the IDLE words are transmitted and received in the data flows and correspondingly captured in the snoop ports as described herein. In exemplary embodiments, by modifying the IDLE word in a predefined sequence, the port under test can tag transactions of interest (i.e., code states of interest). As such, these tagged transactions of interest can be captured in the corresponding debug facility. The types of communication that can be implemented in accordance with the exemplary embodiments described herein can include, but is not limited to: begin transaction capture; end transaction capture; capture following x transactions; capture previous x transactions; (transactions buffered in debug facility); enable trigger on transaction conditions; and disable trigger. As such, it is appreciated that the modified IDLE words can be dynamically initiated within one of the snooping mirrored configurations as described with respect to FIGS. 2-8, via an enabling trigger to initiate and control data capture on one of the tracing devices described herein. Such a trigger can be enabled in response to a particular code transaction that has been previously identified (i.e., code state of interest). Similarly, a modified IDLE word can be implemented to disable the data capture and control on the tracing device described herein. As such, modified IDLE words can be implemented to begin and end a transaction capture once the particular snooping configuration has been established. Additional IDLE words can be modified to capture a set number of transactions being captured either prior to the trigger (such as those transactions stored in the debug facility) or to capture the transactions are to follow.

It is appreciated that numerous modified IDLE words and multiple encodings are contemplated in exemplary embodiments. Modulation of two or more IDLE words can be used or more simply each communication can be signified by a different IDLE word. Modulation of several IDLE words provides the most rapid and richest communication mechanism to provide communication of actual trigger values and more detailed information if needed. In exemplary embodiments, it is appreciated that the code that includes the code state of interest is modified to include the modified IDLE words. As such, when a traffic anomaly occurs, the IDLE words associated with the code can be appropriately communicated to the trace devices as described herein in order to begin data capture and other associated trace functions. In addition, the tracing device (e.g., the debugging computer 290, the logic analyzer 270, and the snoop blade 216) is configured to receive and understand the value of the IDLE words and correspond accordingly. In exemplary embodiments, the values of the IDLE words or the sequence of the IDLE words are modified such that they are still legal IDLE words in the overall system. As such, all other devices on the system, such as other servers, receive the IDLE words and process them as legal IDLE words. However, the server modifying the IDLE words and the appropriate trace devices receive the IDLE words and process the modified values and/or sequences to trigger the appropriate trace functions as described herein.

In exemplary embodiments, if a particular server of a multi-server chassis is communicating with another server external to an SAS switch experiences malformed data in what appears to be an otherwise normal data transfer, the server can modify IDLE words to begin obtaining clues as to the source of the malformed data. It is appreciated that the malformed data may not be originating from the server, but rather from another server in the chassis for example. As such, the server can trigger the tracing device when the server reaches the code state of interest in which the malformed data is experienced. Furthermore, based on the code state of interest and the nature of the malformed data, the server can trigger the tracing device to capture a certain amount of data as well as a location before or after the malformed data to begin and cease capturing data. In this way, the tracing device is preconditioned to know what data to capture, how long to capture the data and how much data to capture. It is appreciated that in this way, the collection of large amounts of data not necessary to debugging the malformed data is prevented. By collecting the data in this way, the user can obtain clues as to the nature of the malformed data and adjust the server from which the IDLE words are modified to further obtain clues as to the nature of the malformed data.

Figure 9:
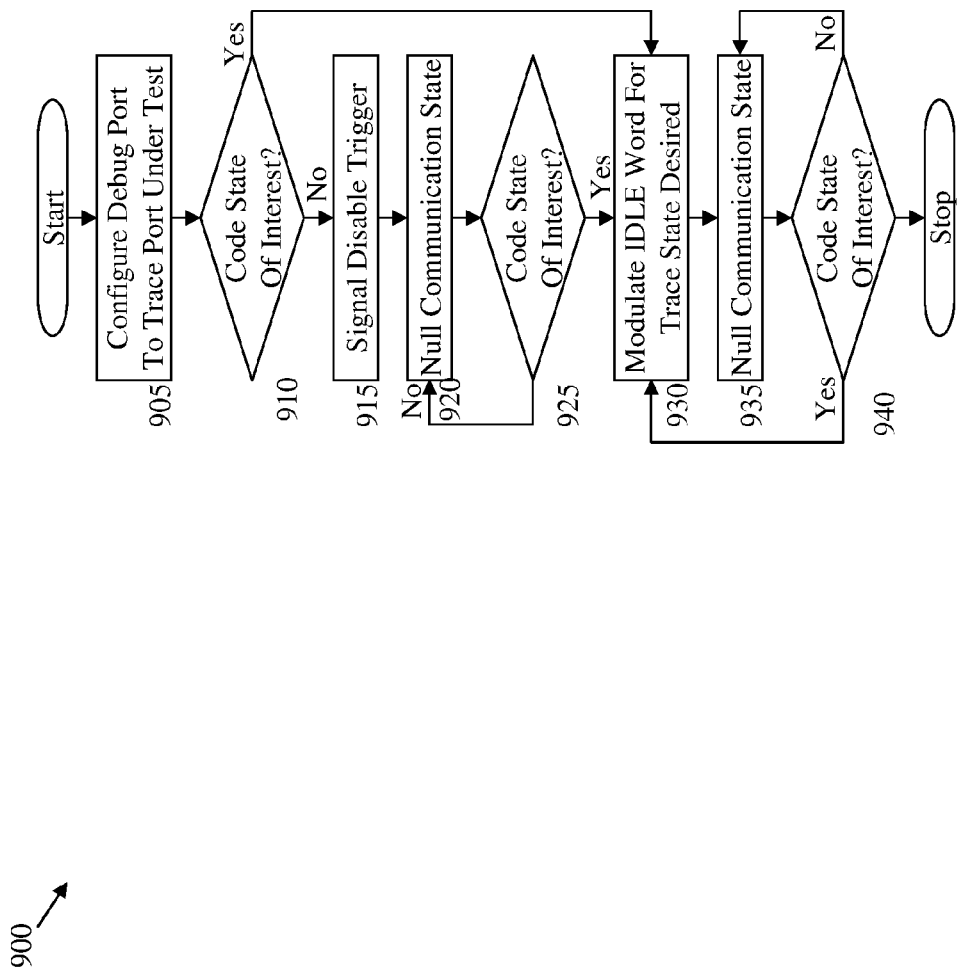
FIG. 9 illustrates a flow chart of an exemplary method for controlling high-speed network traffic.

FIG. 9 illustrates a flow chart of an exemplary method 900 for controlling high-speed network traffic. At block 905, the system configures the debug port to trace the port under test as described above. As described above, either an external computer 290 can be configured on a debug port, a logic analyzer or a server blade can be configured with a debug port. At block 910, the method 900 determines whether or code state of interest has been identified in the system. As described above, the code state of interest is that point in the code where a data failure is occurring or a data malformation is experienced. As further described above, this code state of interest in a particular server, for example, may not be the actual source of the failure or malformation, but may be the server in which the failure or malformation is experienced. By identifying this code state of interest and capturing data at this point, the user can obtain further clues as to the nature of the failure or malformation and can further identify other code states of interest for later capture and analysis. It is appreciated that the other code states of interest may reside on other servers or nodes in the system. If a code state of interest has been identified at block 910, then at block 930, an IDLE word can be modulated for the trace state desired. In exemplary embodiments, the IDLE word can be dynamically modulated based on pre-existing standards. In other exemplary embodiments, an IDLE word can be modified on the fly based on the state of the code when determined. It is appreciated that once the IDLE word is appropriately configured it can be re-captured at the debug facility as described above in order to trigger the appropriate tracing function. For example, the external computer can capture the IDLE word for analysis. In addition, the IDLE word can be captured on one or more of the Tx lines as described herein. Returning to block 910, if no code state of interest is identified, then at block 915, a trigger for disabling any data capture can be sent at block 915. At block 920, the system enters into a null communication state in which IDLE words are transmitted and received into the internal fabric for normal IDLE word operation (e.g., synchronization of communication). As described above, even modified IDLE words are received by dis-interested devices in the system for normal IDLE word operation. It is appreciated however, that the modification of the IDLE words for specific communication between traced and tracing devices provide an in-band communication protocol between the tracing and traced devices by modified IDLE word values and sequences that are not perceived as communication by the dis-interested devices. At block 925, the method 900 further determines whether or not a code state of interest has been detected. If not, the system remains in the null communication state at block 920. If at block 925, a code state of interest has been identified, then at block 930, an IDLE word can be modulated for the trace state desired as described above. At block 935, the system enters into a null communication state in which IDLE words are transmitted and received into the internal fabric as described above. Once again, at block 940, the method 900 determines whether a code state of interest has been identified and the process repeats.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Figure 10:
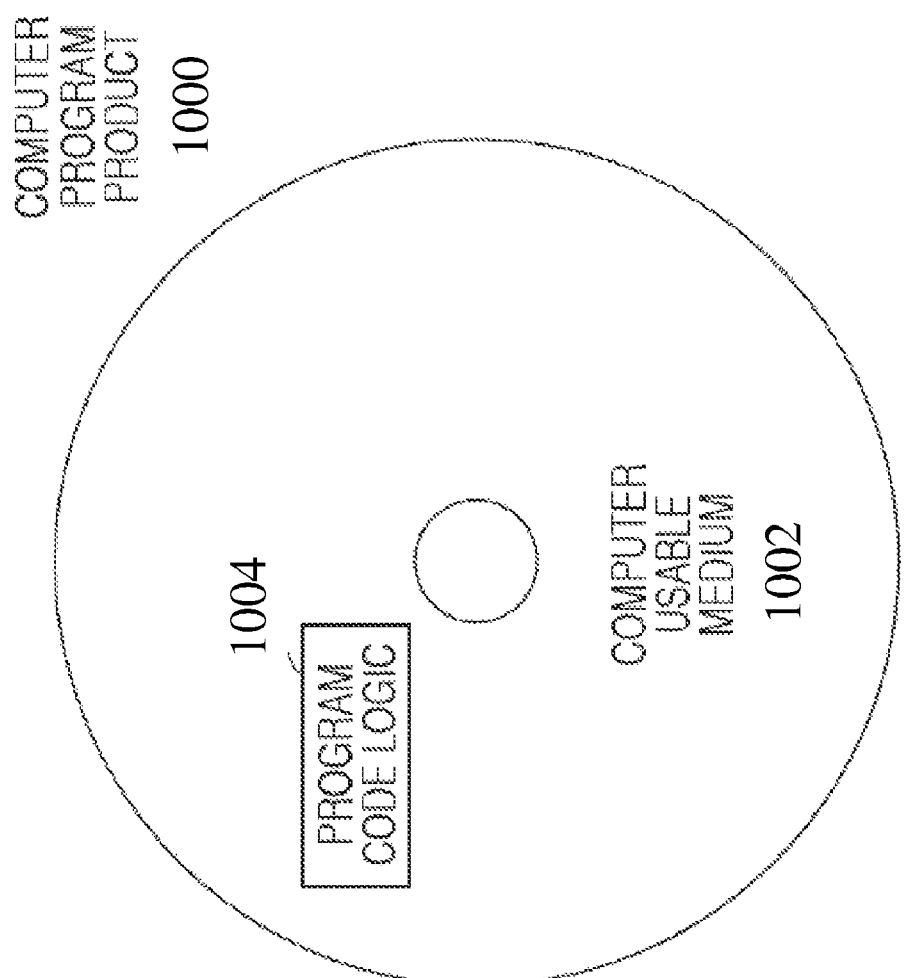
FIG. 10 depicts one embodiment of an article of manufacture incorporating one or more aspects of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 1000 as depicted in FIG. 10 on a computer usable medium 1002 with computer program code logic 1004 containing instructions embodied in tangible media as an article of manufacture. Exemplary articles of manufacture for computer usable medium 1002 may include floppy diskettes, CD-ROMs, hard drives, universal serial bus (USB) flash drives, or any other computer-readable storage medium, wherein, when the computer program code logic 1004 is loaded into and executed by a computer, the computer becomes an apparatus for practicing the invention. Embodiments include computer program code logic 1004, for example, whether stored in a storage medium, loaded into and/or executed by a computer, or transmitted over some transmission medium, such as over electrical wiring or cabling, through fiber optics, or via electromagnetic radiation, wherein, when the computer program code logic 1004 is loaded into and executed by a computer, the computer becomes an apparatus for practicing the invention. When implemented on a general-purpose microprocessor, the computer program code logic 1004 segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for controlling high-speed network traffic, the method comprising:
   identifying a port under test through which transmission of code having a plurality of code states of interest, which indicates that a data failure occurs, and through which transmission of non-data words occurs;
   identifying a debug port to which code associated with the plurality of the code states of interest is routed to analyze;
   identifying the code associated with the plurality of the code states of interest, from the port under test;
   routing the code associated with the plurality of the code states of interest to the debug port;
   generating a modified non-data word in response to an identification of a code state of interest from the port under test; and
   receiving the modified non-data word in conjunction with the code state of interest at the debug port,
   wherein the modified non-data word tags the code associated with the code states of interest to control analysis of the code at the debug port.

2. The method as claimed in claim 1 wherein the port under test transmits non-data words for reception at the debug port.

3. The method as claimed in claim 2 wherein the non-data words include modified values configured to trigger a tracing function at the debug port.

4. The method as claimed in claim 2 wherein the non-data words are transmitted in a sequence configured to trigger a tracing function at the debug port.

5. The method as claimed in claim 2 wherein the non-data words include in-band communication configured to enable the debug port to perform a function selected from the group consisting of: begin transaction capture; end transaction capture; capturing following x transactions; capture previous x transactions; enable trigger on transaction conditions; and disable trigger.

6. The method as claimed in claim 1 further comprising transmitting the modified non-data word in a server blade network.

7. The method as claimed in claim 6 wherein the modified non-data word is configured to trigger a data capture on the debug port.

8. The method as claimed in claim 6 wherein the non-data word is configured to trigger a data capture of data related to the code state of interest on the debug port.

9. A computer program product for controlling high-speed network, comprising a non-transitory computer readable medium including instructions for causing a computer, having a processor, to implement a method, the method comprising:
   Identifying in the processor a port under test through which transmission of code having a plurality of code states of interest, which indicates that a data failure occurs, and through which transmission of non-data words occurs;
   Identifying in the processor a debug port to which code associated with the plurality of the code states of interest is routed to analyze;

Identifying in the processor the code associated with the plurality of the code states of interest, from the port under test;

Routing the code associated with the plurality of the code states of interest to the debug port;

Generating a modified non-data word in response to an identification of a code state of interest from the port under test; and Receiving in the processor the modified non-data word in conjunction with the code state of interest at the debug port, Wherein the modified non-data word tags the code associated with the code states of interest to control analysis of the code at the debug port.

10. The computer program product as claimed in claim 9 wherein the port under test transmits non-data words for reception at the debug port.

11. The computer program product as claimed in claim 10 wherein the non-data words include modified values configured to trigger a tracing function at the debug port.

12. The computer program product as claimed in claim 10 wherein the non-data words are transmitted in a sequence configured to trigger a tracing function at the debug port.

13. The computer program product as claimed in claim 10 wherein the non-data words include in-band communication configured to enable the debug port to perform a function selected from the group consisting of: begin transaction capture; end transaction capture; capturing following x transactions; capture previous x transactions; enable trigger on transaction conditions; and disable trigger.

14. The computer program product as claimed in claim 9 wherein the method further comprises transmitting the modified non-data word in a server blade network.

15. The computer program product as claimed in claim 14 wherein the modified non-data word is configured to trigger a data capture on the debug port.

16. The computer program product as claimed in claim 14 wherein the non-data word is configured to trigger a data capture of data related to the code state of interest on the debug port.

17. A switch module system for controlling high-speed network, the system comprising:

a port under test through which transmission of code having a plurality of code states of interest, which indicates that a data failure occurs, and through which transmission of non-data words occurs;

a debug port communicatively coupled to the port under test, and to which code associated with the plurality of the code states of interest is routed to analyze;

a processor configured to:
identify the code associated with the subset of the plurality of the code states of interest, from the port under test;
route the code associated with the plurality of the code states of interest to the debug port;
generate a modified non-data word in response to an identification of a code state of interest from the port under test; and
route the modified non-data word in conjunction with the code state of interest at the debug port, wherein the modified non-data word tags the code associated with the code states of interest to control analysis of the code at the debug port.

18. The system as claimed in claim 17 wherein the port under test is configured to transmit non-data words for reception at the debug port.

19. The system as claimed in claim 18 wherein the configurable non-data words include modified values configured to trigger a tracing function at the debug port.

20. The system as claimed in claim 18 wherein the configurable non-data words are transmitted in a sequence configured to trigger a tracing function at the debug port.

* * * * *